United States Patent
Matsuhara et al.

(10) Patent No.: US 7,545,527 B2
(45) Date of Patent: Jun. 9, 2009

(54) IMAGE PROCESSING APPARATUS AND DATA PROCESSING APPARATUS

(75) Inventors: Kenji Matsuhara, Kawanishi (JP);
Nobuhiro Mishima, Osaka (JP);
Takeshi Minami, Amagasaki (JP);
Toshihiko Otake, Amagasaki (JP);
Daisetsu Tohyama, Amagasaki (JP)

(73) Assignee: Minolta Co., Ltd., Osaka-Shi, Osaka (JP)

(*) Notice: Subject to any disclaimer, the term of this patent is extended or adjusted under 35 U.S.C. 154(b) by 1141 days.

(21) Appl. No.: 10/622,494

(22) Filed: Jul. 21, 2003

(65) Prior Publication Data

US 2004/0190045 A1 Sep. 30, 2004

(30) Foreign Application Priority Data

Mar. 26, 2003 (JP) ............................. 2003-086112

(51) Int. Cl.
*G06F 15/00* (2006.01)
*G06F 3/12* (2006.01)

(52) U.S. Cl. ..................................... 358/1.15; 358/1.13

(58) Field of Classification Search ................. 358/1.1, 358/1.8, 1.9, 1.13, 1.14, 1.15, 474, 448; 715/5; 347/111, 129; 355/78, 81, 84; 399/150, 399/151, 152
See application file for complete search history.

(56) References Cited

U.S. PATENT DOCUMENTS

| 6,519,048 | B1 | 2/2003 | Tanaka |
| 2001/0053246 | A1* | 12/2001 | Tachibana et al. ........... 382/162 |
| 2002/0015160 | A1* | 2/2002 | Kashiwagi .................. 358/1.1 |
| 2004/0049608 | A1* | 3/2004 | Sakurai ........................ 710/5 |

FOREIGN PATENT DOCUMENTS

| JP | 2000-20270 | 1/2000 |
| JP | 2000-307834 | 11/2000 |
| JP | 2002-94784 | 3/2002 |
| JP | 2002-330253 | 11/2002 |

* cited by examiner

*Primary Examiner*—Gabriel I Garcia
(74) *Attorney, Agent, or Firm*—Buchanan Ingersoll & Rooney PC

(57) ABSTRACT

An image processing apparatus has first and second processors for performing first and second processings for image data received by a communication device. A data processing apparatus instructs for the image processing apparatus to execute the first and second processings for image data. When the image data and the instruction therefor are received, the image processing apparatus performs the first and second processings, and sends the image data processed by the second processor to the data processing apparatus, which replaces the received file with the transmitted file.

8 Claims, 11 Drawing Sheets

IMAGE PROCESSING APPARATUS AND DATA PROCESSING APPARATUS

This application is based on application No. 2003-86112 filed in Japan, the contents of which are hereby incorporated by reference.

BACKGROUND OF THE INVENTION

1. Field of the Invention

The present invention relates to a system including an image processing apparatus having a plurality of functions.

2. Description of Prior Art

Image processing apparatuses such as a copying machine, a printer, a multi-functional peripheral (hereinafter referred to as MFP) and the like are used widely. For example, a copying machine copies an image of a document, and a printer prints an image data received from a host computer. Recently, the number of functions equipped in an image processing apparatus is increased, and the performance and the quality of the functions thereof become higher. Besides the conventional copying and printing, it is widely used to store data of a document image read by a scanner or to transmit it to an external apparatus. Further, a file of image data may be outputted after the image data is subjected to color conversion. By providing such functions in an image processing apparatus, it is not necessary to have apparatuses of exclusive use. Then, the space thereof in an office is decreased, the cost thereof is decreased, and a system including such an image processing apparatus is simplified.

When a plurality of functions equipped in an image processing apparatus are used, a job is generated for each function. For example, when a copying function is used, a copy job is generated, and when a facsimile transmission is used, a facsimile transmission job is generated besides the copy job. In this case, different jobs are performed on the same document, and it is needed to read the document twice. In order to solve this problem, in the MFP described in Japanese Patent laid open Publication 2000-307834, copying and facsimile transmission can be performed simultaneously after reading a document once.

In a printer described in Japanese Patent laid open Publication 2000-20270, in order for a user at a remote terminal to confirm a print result easily, a image file received from the remote terminal is printed, while the printed image data is converted and stored to a format of Joint Photographic Experts Group (JPEG) or portable document format (PDF), and a print job data of the image data including a uniform resource identifier in the network is sent back to the host computer. The printed image data can be checked by the host computer with use of the uniform resource identifier. In a printer described in Japanese Patent laid open Publication 2002-94784, after a raster image generated from the input data is printed, the raster image is converted to a general image format and stored in the image processing apparatus. Thus, it becomes easier to transmit the image data.

As the functions equipped for an image processing apparatus become various, it is proposed to have an account for each function (or service). For example, in a service system described in Japanese Patent laid open Publication 2002-330253, accounting is performed for each service such as printing, file format conversion or file transmission on the same image data.

In the above-mentioned printer described in Japanese Patent laid open Publication 2000-20270, an image data is printed, while its file format is changed and stored. The image data obtained by the file format conversion is stored in a storage device designated by the user. Therefore, it is necessary for a user to designate the storage device. Further, in order to confirm the result of the file format conversion or to replace the converted file with the original file, it is necessary for the user (or the image processing apparatus) to access the storage device, and to transmit the converted file thereto. As explained above, when two among a plurality of functions are used, the operation for instructing the two functions is troublesome for a user. Therefore, when a plurality of functions equipped in an image processing apparatus is used on an image data received from an external apparatus, it is desirable to simplify the operation therefor.

SUMMARY OF THE INVENTION

An object of the invention is to make it easier for a user to use an image processing apparatus equipped with a plurality of functions on image data.

In one aspect of the invention, an image processing apparatus comprises a communication device which receives and sends image data and a command through a network, a first processor which performs a first processing in the plurality of processings for the image data received by the communication device and a second processor which performs a second processing in the plurality of processings, different from the first processing, for the image data received by the communication device. When a command received by the communication device instructs the first and second processings, a controller makes the first processor perform the first processing, makes the second processor perform the second processing and sends the image data processed by the second processor through the communication device.

In a second aspect of the invention, a data processing apparatus comprises a storage device which stores files of image data, and an instructor which receives a user's instruction for the image processing apparatus equipped with a plurality of processings for image data. A transmitting device transmits a file of the image data and the instruction through a network to the image processing apparatus. When a receiving device receives the file of the image data subjected to the second processing by the image processing apparatus, a replacement device replaces the received file with the transmitted file.

An advantage of the present invention is that a plurality of processings can be used more easily in an image processing apparatus.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
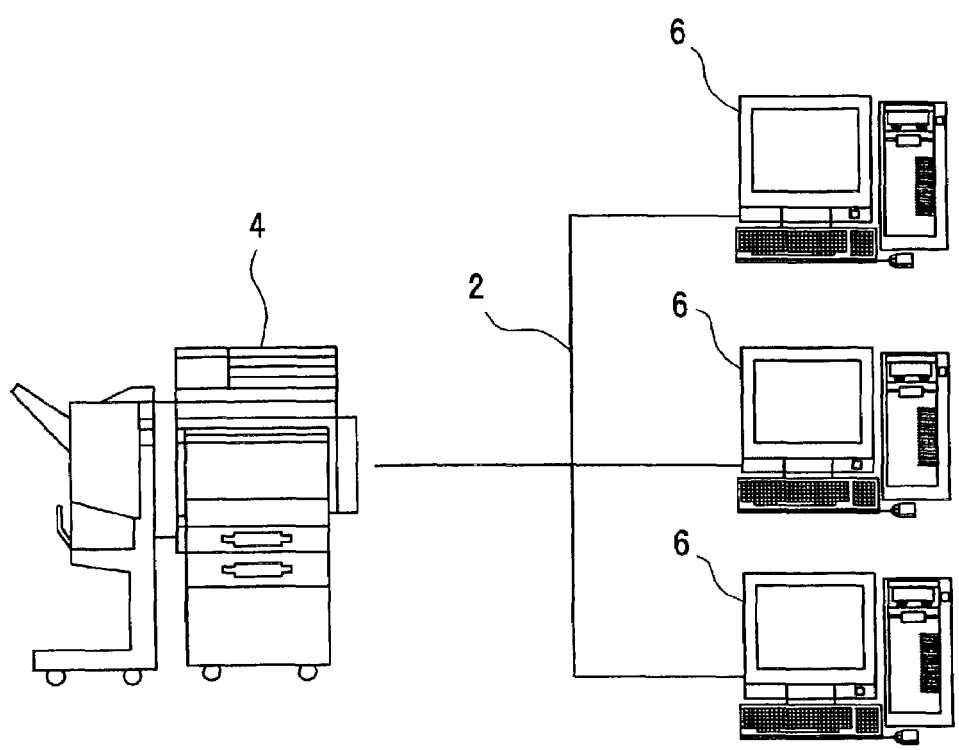
FIG. 1 is a diagram of a network including a multi-functional peripheral.

Referring now to the drawings, wherein like reference characters designate like or corresponding parts throughout the several views, FIG. 1 shows a multi-functional peripheral (hereinafter referred to as MFP) 4 and host computers 6 such as personal computers connected to a network 2 such as a local area network. In this example, three host computers 6 share the MFP 4. The MFP 4 has a scanning function for reading a document image put on a platen, a printing function for printing an image and the like, and it can perform a plurality of processings on an image data. For example, when a host computer 6 makes print data and sends a print job to the MFP 4, the MFP performs the print job.

Figure 2:
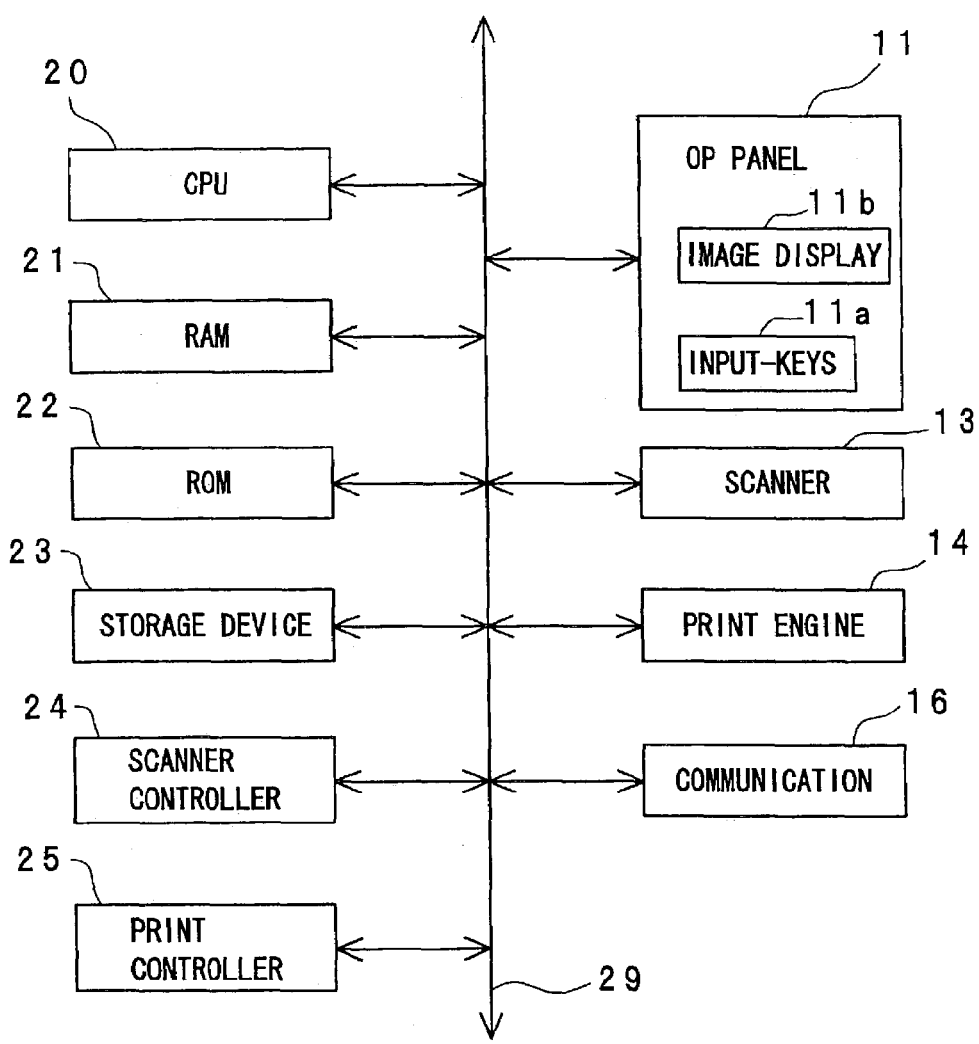
FIG. 2 is a block diagram of the multi-functional peripheral.

FIG. 2 shows the internal structure of the MFP 4. It has an operational panel 11 including input-keys 11a for inputting various instructions and settings and a display panel 11b for displaying an image. Further, it has a scanner 13 for reading an image, a print engine 14 for printing an image, and a communication device 16 for transmission through the network 2. A central processing unit (hereinafter referred to as CPU) 20 for controlling the MFP 4 is connected through an internal bus 29 to a random access memory (hereinafter referred to as RAM) 21, a read-only memory (hereinafter referred to as ROM) 22, a storage device 23 such as a hard disk drive, a scanner controller 24 and a print controller 25, besides the above-mentioned components 11-16. The scanner controller 24 controls the scanner 13, and the print controller 25 controls the print engine 24.

Figure 3:
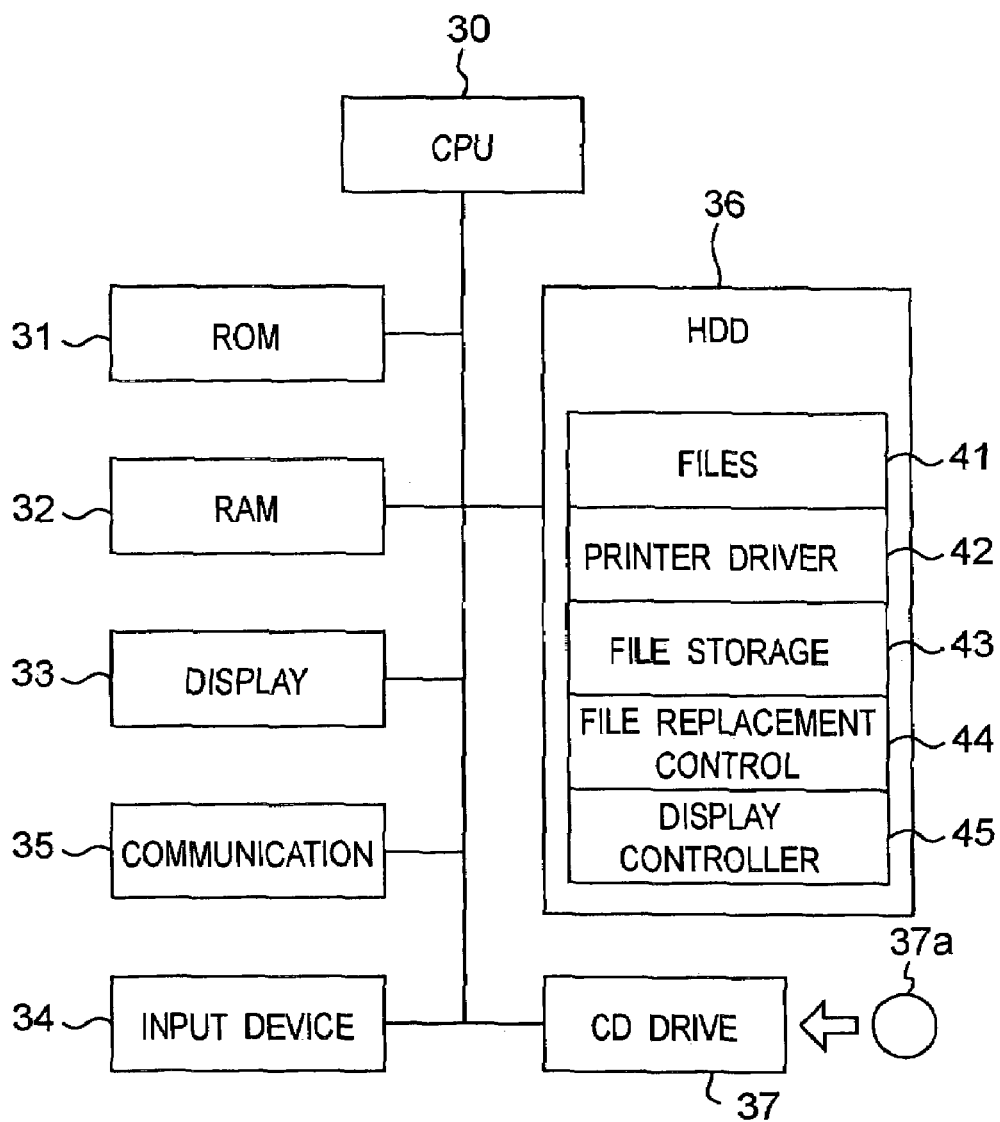
FIG. 3 is a block diagram of a host computer.

FIG. 3 shows a structure of the host computer 6. It has a CPU 30 for controlling the entire computer 6, and a ROM 31 and a RAM 32 connected thereto, similarly to a conventional computer. The CPU 30 is further connected to a display device 33, input devices 34 such as a keyboard, a mouse and the like, and a communication device 45 for transmission through the external network 2. It is also connected to a hard disk drive (HDD) 36 including a hard disk for storing program and data files and a compact disk drive 37 for access with a compact disk 37a. Programs stored in a hard disk, a compact disk or the like include, for example, a printer driver 42a for preparing and instructing a print job, a file storage program 43 for storing files 41, a file replacement controller 44, and a display controller 45 for the display device 33, besides an operating system, various application programs and files 41.

A recording medium for storing such programs in MFP 4 and the host computer 6 may be a flexible disk (floppy disk) or various optical disks beside the above-mentioned hard disk, and they are accessed by drives therefore such as a flexible disk drive and an optical disk drive.

Figure 4:
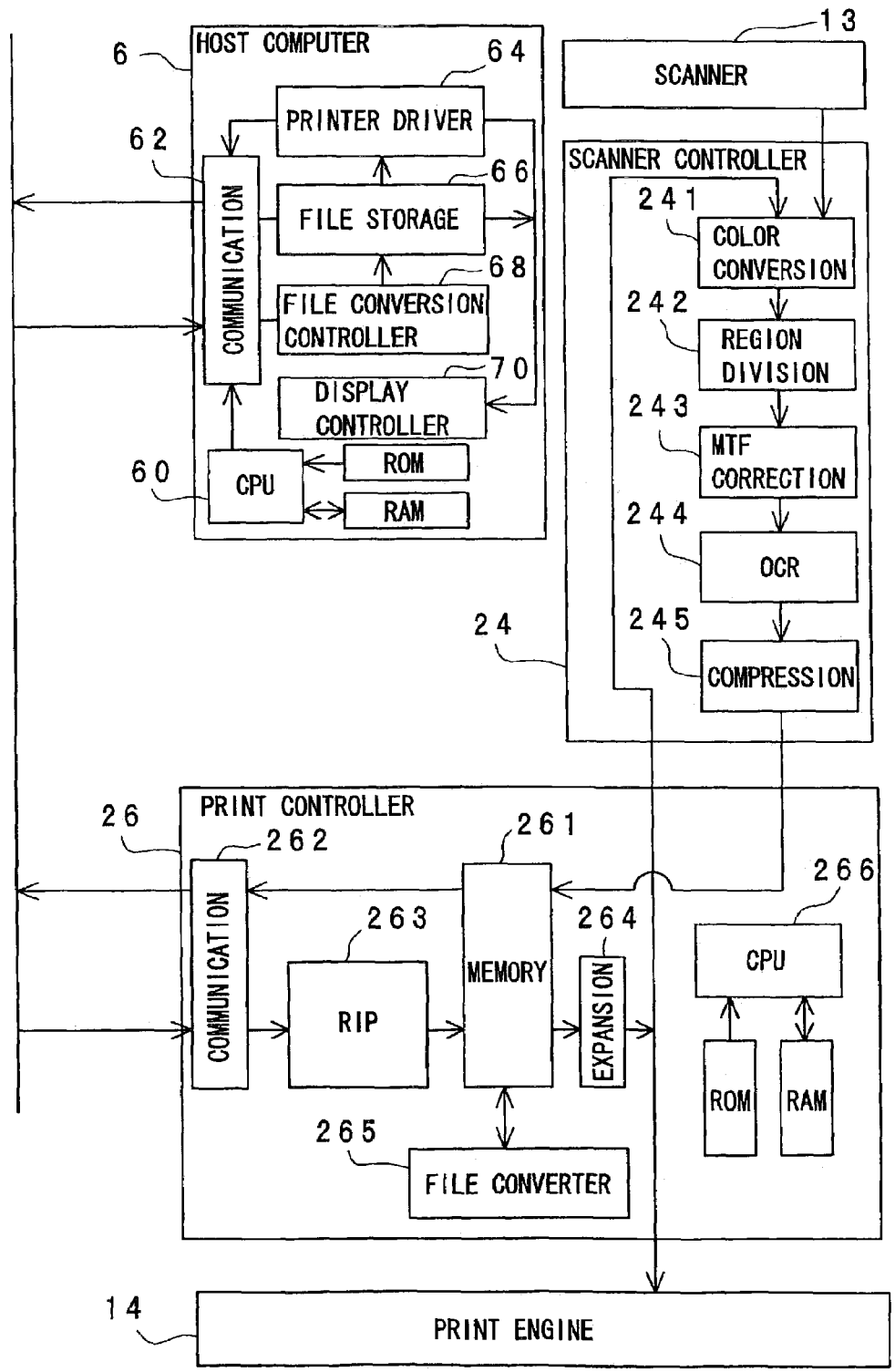
FIG. 4 is a diagram on a part of the multi-peripheral functional and the host computer relevant to file replacement.

FIG. 4 shows internal structures of the scanner controller 24 and the printer controller 26. In the scanner controller 24, image data read by the scanner 13 or received through the network 2 is sent to the color converter 241, which converts the input image data of red (R), green (G) and blue (B) to, for example, data of HCV color space. Next, a region divider 242 divides the image data into character regions, photograph regions and the like based on the converted image data. Next, a modulation transfer function (MTF) corrector 243 performs image correction such as edge emphasis or smoothing. Next, an optical character recognition (OCR) processor performs OCR on character image regions and corrects character codes on the recognized characters. Next, a compression processor 245 encodes the image data processed as mentioned above, for example, with compact portable document format (PDF) and sends the compressed data to the print controller 26.

The print controller 26 stores the compressed data received from the scanner controller in the memory 261. When print is instructed by a host computer 6, print data described in a page description language is sent through the network 2 to the MFP 4 to be dealt with the print controller 26. The print data received by the communication device 262 in the print controller 26 is converted by a raster image processor (RIP) 263 and stored in the memory device 261. The print engine 14 prints the data received from the memory device 261.

On the other hand, when image data read by the scanner 13 is printed, an expansion processor 264 expands the compressed data received from the memory device 261, and the expanded luster data are sent to the print engine 14, which prints the received image data.

A file converter 265 converts the format of a file in the memory 261 to, for example, compact PDF format. It is possible to convert it to a format such as tag image file format (TIFF) or Joint Photographic Experts Group (JPEG) format. It may also be converted to one of a plurality of formats. Code data in the memory 261 are read and transmitted through a communication device 262 and the network 2 to a host computer 5. Thus, image data obtained by the scanner 13 are sent to the host computer 6. At this time, the image file is attached to an e-mail which is sent to the host computer 6.

If the file data, such as a PDF file, received from the host computer 6 is not yet compressed, the file data received from the host computer 6 is sent through the print controller 26 to the scanner controller 24 or a module for the scanner 13. In the scanner controller 24, the color conversion and the area division are performed, and the image data is compressed for example in compact PDF format. Then, it is sent from the scanner controller 24 through the memory device 261 to the print engine 14. When simultaneous processing is instructed, as will be explained later, the printing of the image data is performed, while the compressed compact PDF file of the image data is sent to the host computer 6 to be replaced with the original file.

Figure 5:
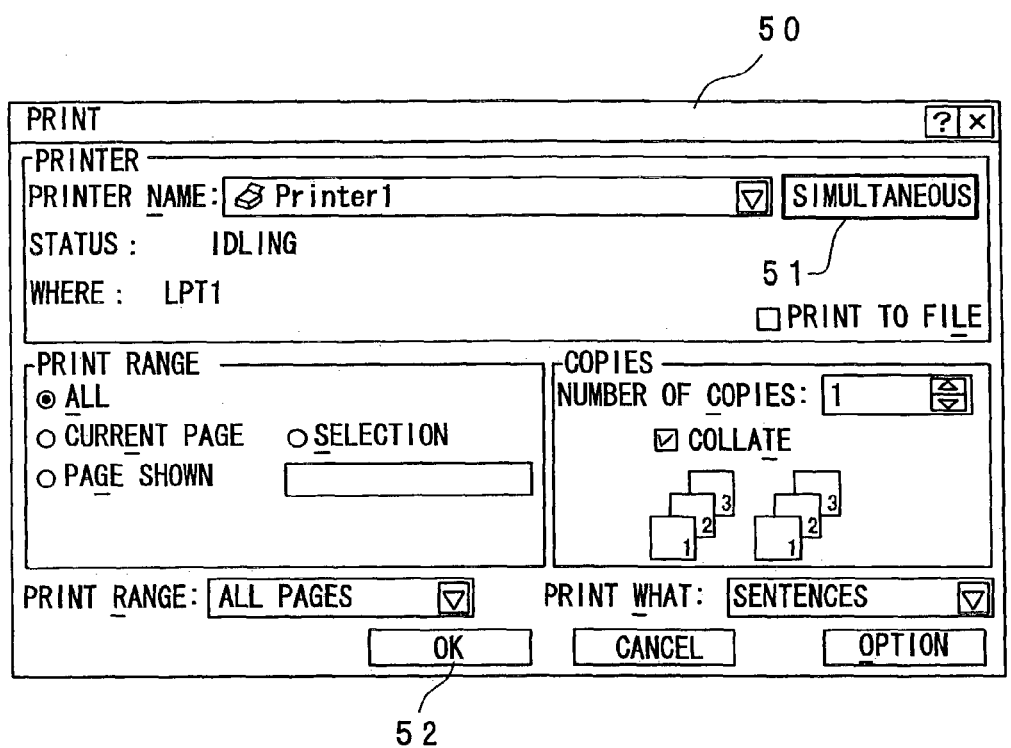
FIG. 5 is a diagram of an example of a screen for instructing printing.

FIG. 5 shows an example of a screen of a print dialog box of the printer driver 64 when the host computer 6 instructs printing. In the printer section in the print dialog box, the name, the status and the connection port of the printer are displayed. Further, a button 51 for simultaneous printing is provided. In the print range section, a range of pages to be printed can be set, and in the copies section, the number of copies can be set. Further, in the print what section, an object to be printed is set, and in the print range section, all pages, odd pages, even pages or the like is set. Further, "OK" button, "cancel" button and "option" button are provided at the lowest portion in the screen.

In the print dialog box shown in FIG. 5, it is to be noted that the simultaneous processing button 51 is provided, in contrast to a prior art print dialog box. When the simultaneous processing button 51 is clicked, the MFP 4 equipped with a plurality of processings on image data receives the simultaneous processing command and performs a second processing among the plurality of processings simultaneously while the first processing is dealt with. The "processing" represents a processing which can be instructed by the MFP 4. Further, "simultaneous processing" means a processing in a plurality of kinds of processings on an image data according to one instruction. The plurality of kinds of processings may be performed in parallel or in series. The "image data" includes, beside the data on an image itself, data such as print data which describes an image in a broader sense. The first processing is printing in this example. The second processing for the simultaneous processing may be set by a user beforehand. Any processing provided for the image processing apparatus (MFP 4 in this example) used for performing the first processing is designated for the second processing, it is not needed to use another apparatus for the second processing. For example, the file converter 264 which converts the file format for the scanner 13 is also used as a device for performing file conversion. This file conversion is the conversion of file format.

A user of the host computer 6 instructs file conversion as the second processing at the same time as printing, and sends print data from the host computer 6 with the instruction. The MFP 4 performs the file conversion while performing the printing, and send the converted file to the host computer 6 which sends the print data. The data sent by the host computer 6 is print data described in a page description language by the printer driver. The print controller 26 in the MFP 4 develops the data in raster data and stores it in the memory device 261. Then, for the second processing, the file converter 265 converts the raster data to for example the compact PDF format to reduce the amount of the data. Then, the data file after the file conversion is sent back to the host computer 6. When the host computer 6 receives the data, it replaces the original image file automatically therewith so as to reduce the amount of the data. By using the simultaneous processing, a user can instruct operations of a plurality of processing easily.

The first processing is, in the above-mentioned example, printing of image data sent from the host computer 6. Alternatively, it may be transmission of a PDF file. The second processing is, in the above-mentioned example, the conversion of file format of the received image data. As the second processing, any processing equipped in the MFP 4 and useful for the user at the host computer 4 may be set. For example, in the file format conversion, the file is converted to reduce the amount of file data, and the file after the conversion is transmitted to the host computer to replace it with the original file. Thus, the amount of data in the host computer 6 is reduced. The second processing may be color conversion, optical character recognition (OCR) and correction, sharpness processing or the like, and the file after the second processing is sent back to the host computer 6.

Figure 6:
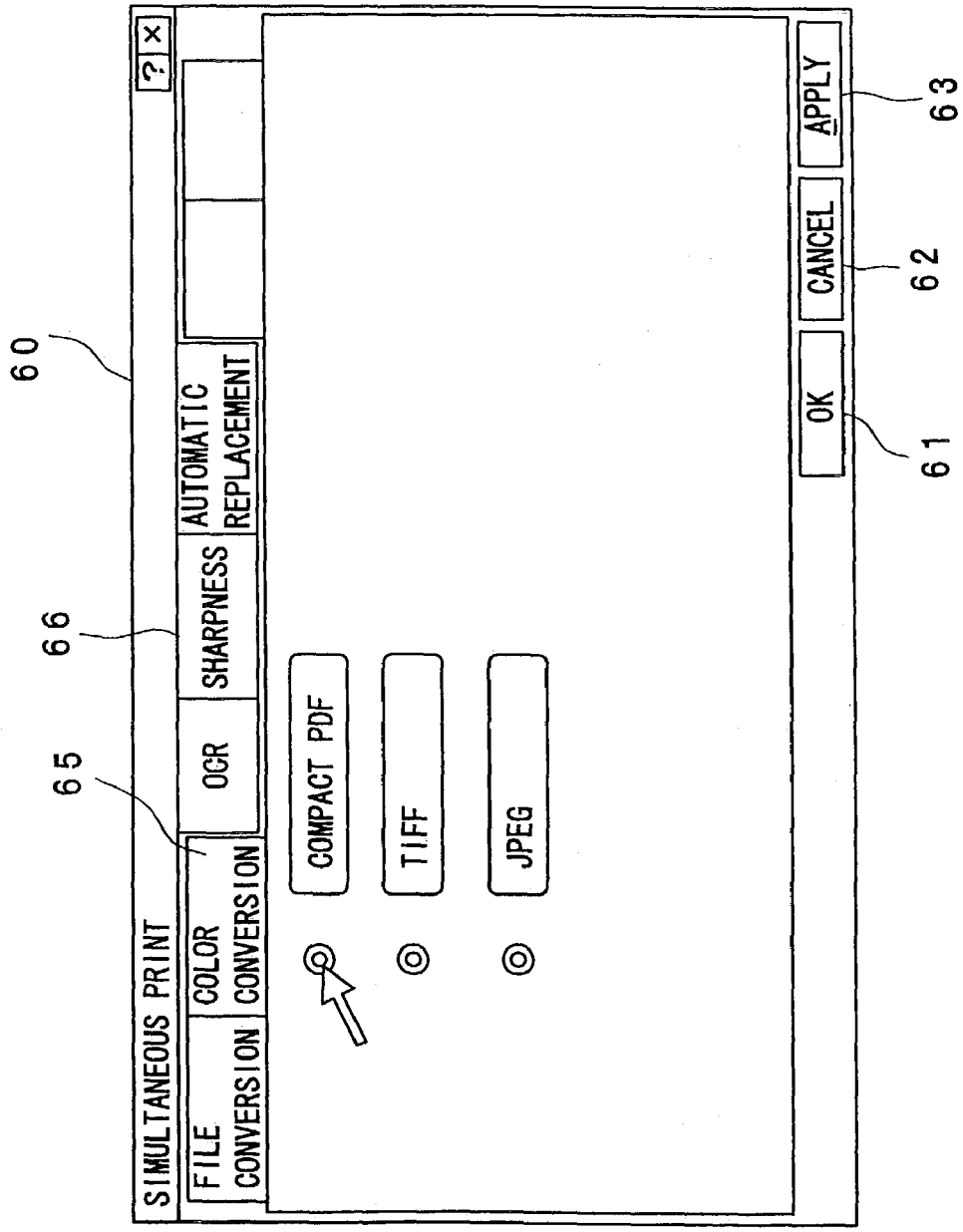
FIG. 6 is a diagram of an example of a screen for instructing color conversion.

FIG. 6 shows a dialog box displayed in a screen when the option button is pressed in the dialog box shown in FIG. 5. The second processing to be set for the simultaneous processing includes, file conversion, color conversion, OCR, and sharpness correction. Further, automatic replacement can be instructed to perform replacement with the original data file in the simultaneous processing.

FIG. 6 shows a dialog box for the file conversion, and conversion of image file format to compact PDF, TIFF or JPEG can be selected in the dialog box. When the file conversion is performed simultaneously with printing, a screen of user interface is provided for the user to select a file format. Thus, a user can select any desired file format, and a range of user's selection becomes wider.

Figure 7:
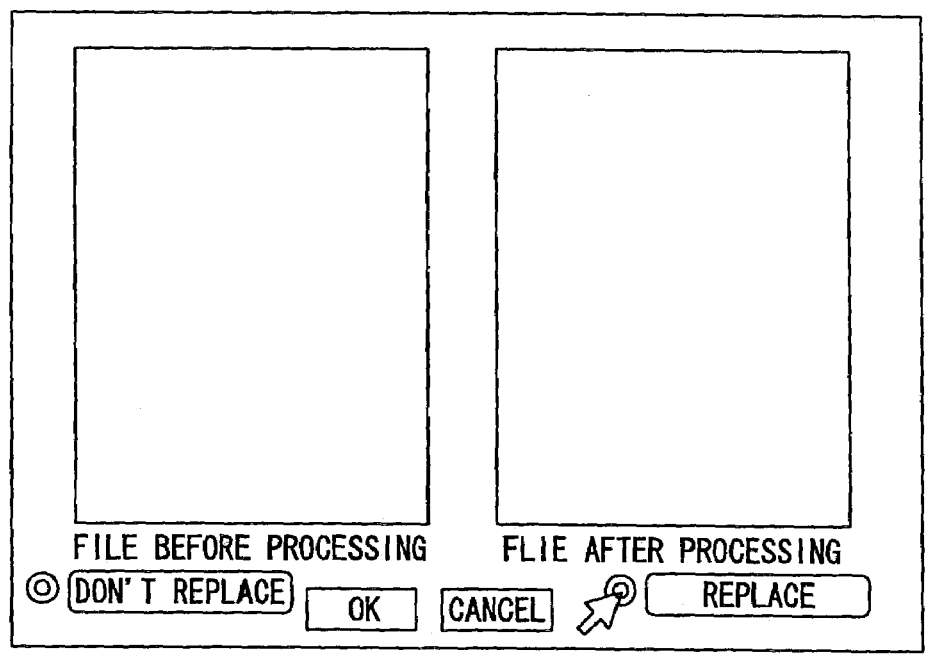
FIG. 7 is a diagram of an example of a screen for instructing file replacement.

Further, in a dialog box for the color conversion (not shown), the content of the color conversion for the image data is set by a user. In a dialog box for the OCR, the content of OCR on character image is set by a user. In a dialog box for the sharpness processing, the content of sharpness processing is set by a user. In a dialog box for the automatic replacement, the content of automatic replacement is set by a user. In the automatic replacement, for example, the received file is replaced automatically with the original file. Alternatively, the converted file may be replaced with the original file in the host computer 6 only when its size becomes smaller by more than a predetermined amount. Alternatively, as shown in FIG. 7, the converted file and the original file are displayed in a screen, and a user can be select to replace the file or not. In this case, the file conversion is performed only when a user instructs the file replacement. Alternatively, when a format for the conversion is not selected by a user, a predetermined file format may be set automatically to reduce the amount of file data. Thus, conversion to a compressed file is performed while the MFP 4 performs printing, and the converted file is replaced with the original file in the host computer 6. Thus, the automatic file replacement can be performed with a simple operation in order to reduce the amount of file data in the host computer 6.

The second processing to be processed simultaneously is preferably set based on the first processing. For example, if the first processing is color print, the second processing is set to color conversion, or if the first processing is transmission of a PDF file, the second processing is set to conversion to another format. Thus, the second processing favorable for a user is selected automatically. Alternatively, a list of selectable second processings is displayed in a screen, and a user can select one of them.

In the screen shown in FIG. 5, when image data is transmitted after the simultaneous processing button is clicked, the second processing (or file conversion in this example) is performed simultaneously. Preferably, the host computer 6 receives the image data subjected to the second processing, and the screen for selection shown in FIG. 7 to check the received image data and the original image data. The files before and after the processing are shown at the left and right side in the screen, and the user who issued the print job observes and compares the image data before and after the processing to confirm the result of the second processing (file conversion, color conversion, OCR and encoding, or the like) performed during the printing by the image processing apparatus (MFP). Next, the user clicks in the selection screen the "replace" button or the "don't replace" button. When the "replace" button is clicked, the file after the processing is sent to the host computer 6. For example, when the file format is changed to compact PDF format, an e-mail is sent to the host computer 6 to inform the file replacement to the user who instructs the printing. The host computer 6 has the tool 68 to replace the received file to the original file, and the original file is replaced with the received file.

Alternatively, the screen for selection shown in FIG. 7 is displayed only when the amount of data of the file after the processing is smaller than that of the file before the processing, or only when it is smaller by more than a predetermined size. Thus, when the "replace" button is clicked, the original file is replaced if the file size becomes smaller. Thus, for example, when a PDF file is printed, it is converted to compact PDF format, so that the amount of data in the host computer can be decreased by a simple instruction procedure.

Alternatively, when a file subjected to the second processing is received from the MFP 4, it is replaced automatically with the original file, without displaying the selection screen shown in FIG. 7. In this case, when the host computer 6 receives the image data attached to an e-mail, it replaces the original file with the received one automatically.

Figure 8:
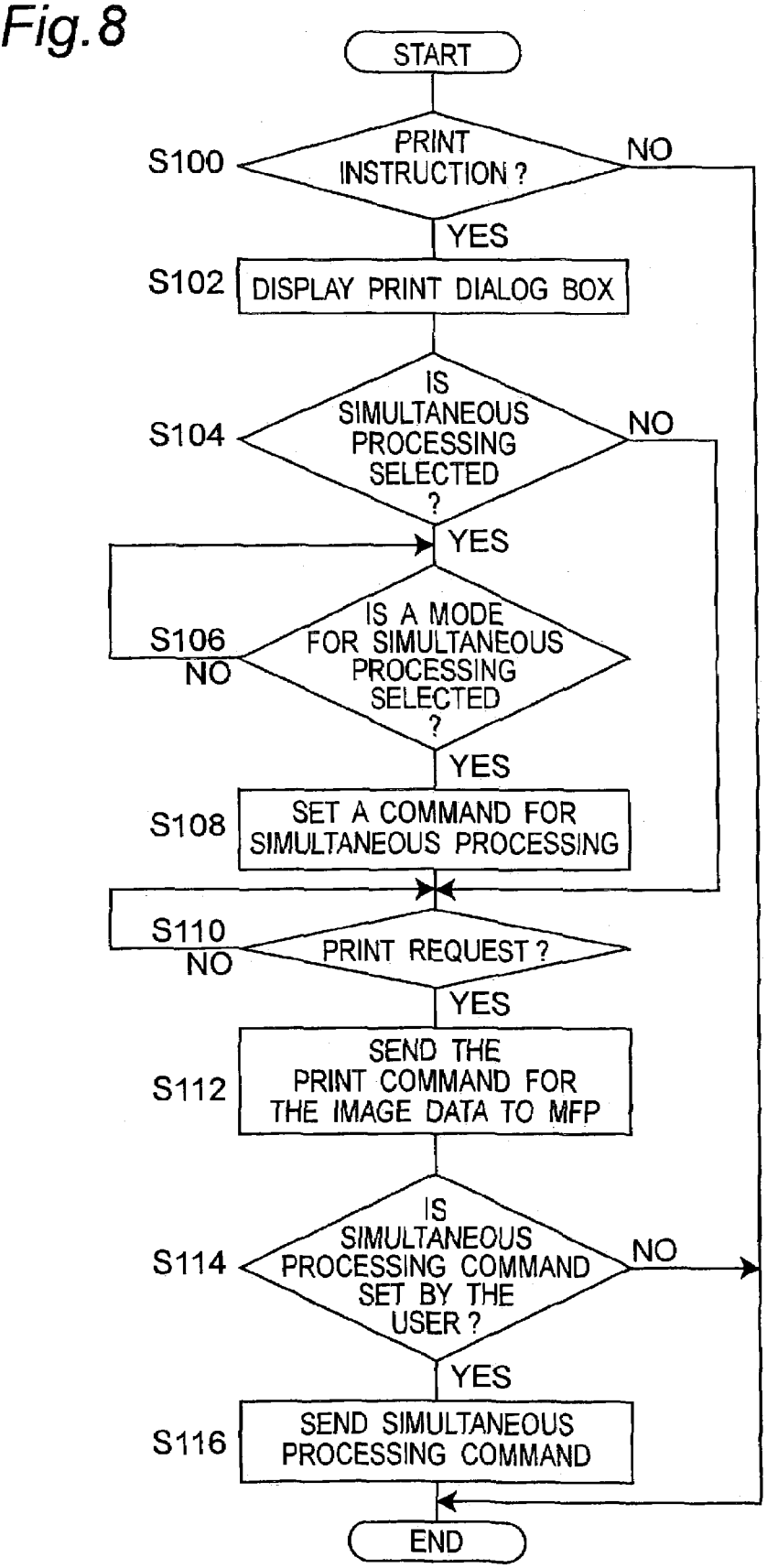
FIG. 8 is a flowchart of printing of the host computer.
Figure 9:
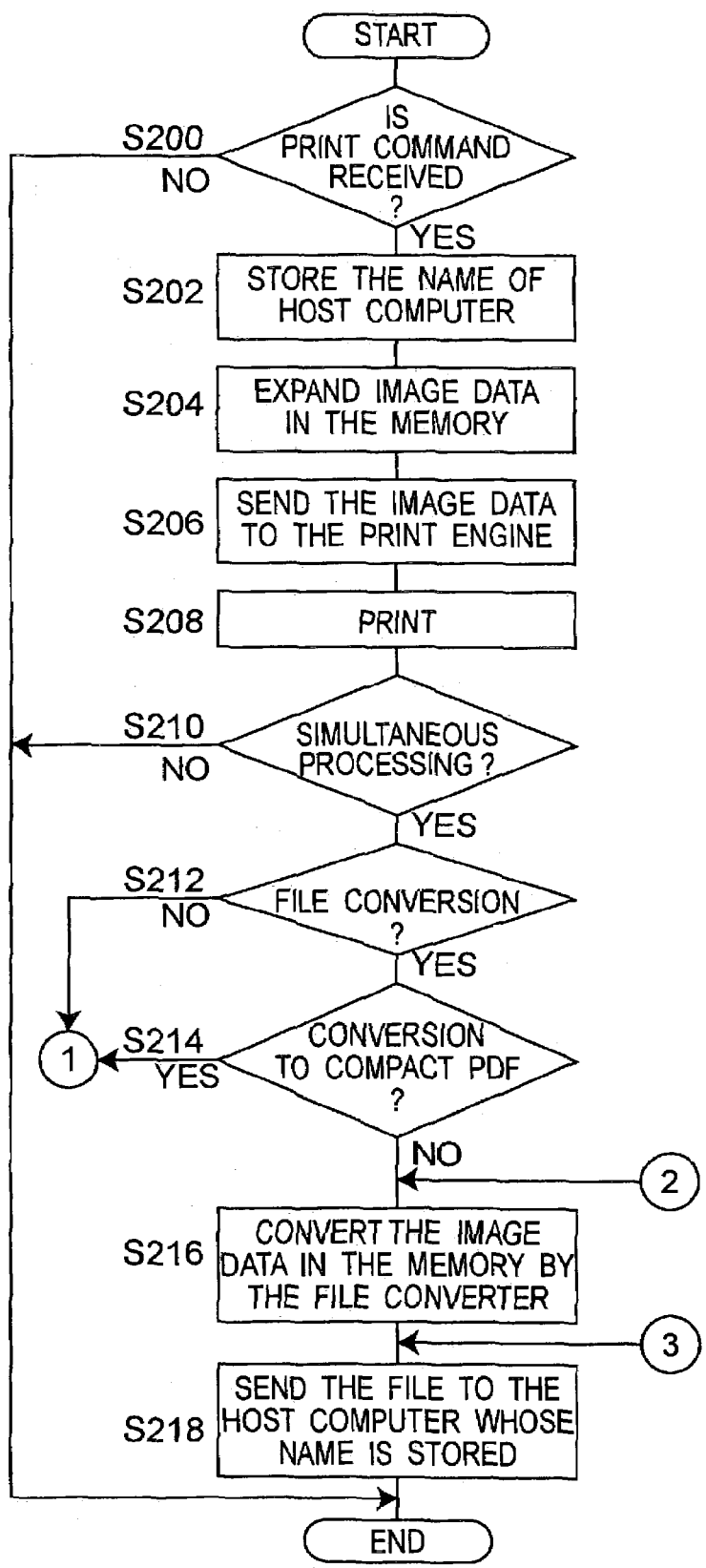
FIG. 9 is a part of a flowchart of a part of printing of the multi-functional-peripheral.

FIGS. 8 and 9 show flowcharts of the host computer 6 and of the MFP 4, respectively, when printing and automatic processing are instructed. A user selects in the screen shown in FIG. 5 to perform file conversion simultaneously with printing, if desirable. When the simultaneous processing is selected, the screen for selecting a file format shown in FIG. 6 is displayed, and the user selects a file format such as compact PDF. Then, these commands are sent to the MFP 4 while the image data of a PDF file or the like is sent. The MFP 4 receives through the network 2 the simultaneous processing command and the PDF file. Then, the MFP 4 prints the PDF file. Further, in correspondence to the simultaneous processing, if the second processing is color conversion, it sends the file data to the scanner 13 to perform the color conversion and converts the file to the compact PDF format file. The file after the processing is sent through the network 2 to the host computer 6, which replaces the received file with the original one.

FIG. 8 shows the processing of the printer driver 42 in the host computer 6. When a print command by a user is received (YES at S100), a print dialog box is displayed in the screen (S102). If simultaneous processing is selected by the user (YES at S104), another screen is shown for the user to select a second processing to be processed simultaneously by the first command. At this time, a list of selectable modes is displayed in the screen, and the user can select any one of them. When a second mode is selected (YES at S106), a command therefor is issued (S108). Preferably, the second mode is selected automatically based on a mode predetermined according to the first mode. For example, if the first mode is color printing, the second mode is set to color conversion, and if the first mode is transmission of PDF file, the second mode is set to conversion to of a different format.

Next, when the print command is issued (YES at S110), a print command for the image data is sent to the MFP 4 (S112). Then, when simultaneous processing is decided to be set by the user (YES at S114), simultaneous processing command is also sent (S116).

FIG. 9 shows the processing of the MFP 4. When the print command is received from the host computer 6 (YES at S200), the name of the host computer 6 is stored (S202). Then, the received image data are developed in the memory device 261 (S204) and are sent to the print engine 14 (S206). Then, print processing is instructed to be performed by the print engine 14 (S208).

If the simultaneous processing is decided to be instructed (YES at S210), it is decided next whether file replacement is requested or not (S212). If file replacement is requested, it is decided next whether the file conversion to compact PDF is instructed or not (S214). If file replacement is requested, but the file does not have compact PDF format (NO at S214), the file format of the image data in the memory device 261 is converted by the file converter 265 (S216), and the converted file is sent to the host computer 6 wherein the original file is stored (S218). On the other hand, if the file conversion is not requested (NO at S212) or if file format conversion to compact PDF format is requested (YES at S214), the image data in the memory device 261 is sent to the scanner controller 24 (S220). Next, the flow branches according to the second processing. If the second processing is color conversion (YES at S222), the color conversion is performed by the scanner controller 24 (S224). If it is sharpness correction (YES at S226), the sharpness correction is performed by the scanner controller 24 (S228). If it is optical character recognition (OCR) (YES at S230), OCR and code correction are performed by the scanner controller 24 for a character image (S232). Otherwise region division is performed by the scanner controller 24 (S234), and data compression is performed for each region with an optimum compression process (S236).

Next, the image data after subjected to the above-mentioned processing is sent to the printer controller 26 (S238) and stored in the memory device 261 (S240). Next, if the file does not have compact PDF format (NO at S242), the flow proceeds to step S216 to convert the file format by the file converter 265, while if the file format is compact PDF format (YES ate S242), the flow proceeds to step S218 to send the converted file.

Figure 11:
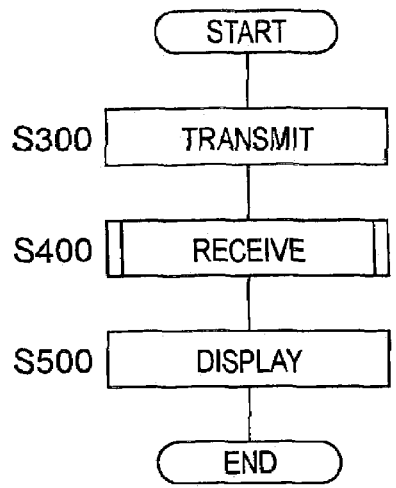
FIG. 11 is a flowchart of e-mail transmission of the multi-peripheral functional.

FIG. 11 shows a flow of the e-mail program of CPU 20 of MPF 4. Processing of transmitting an e-mail (S300), receiving an e-mail (S400) and displaying e-mail(s) (S500) are performed successively.

Figure 10:
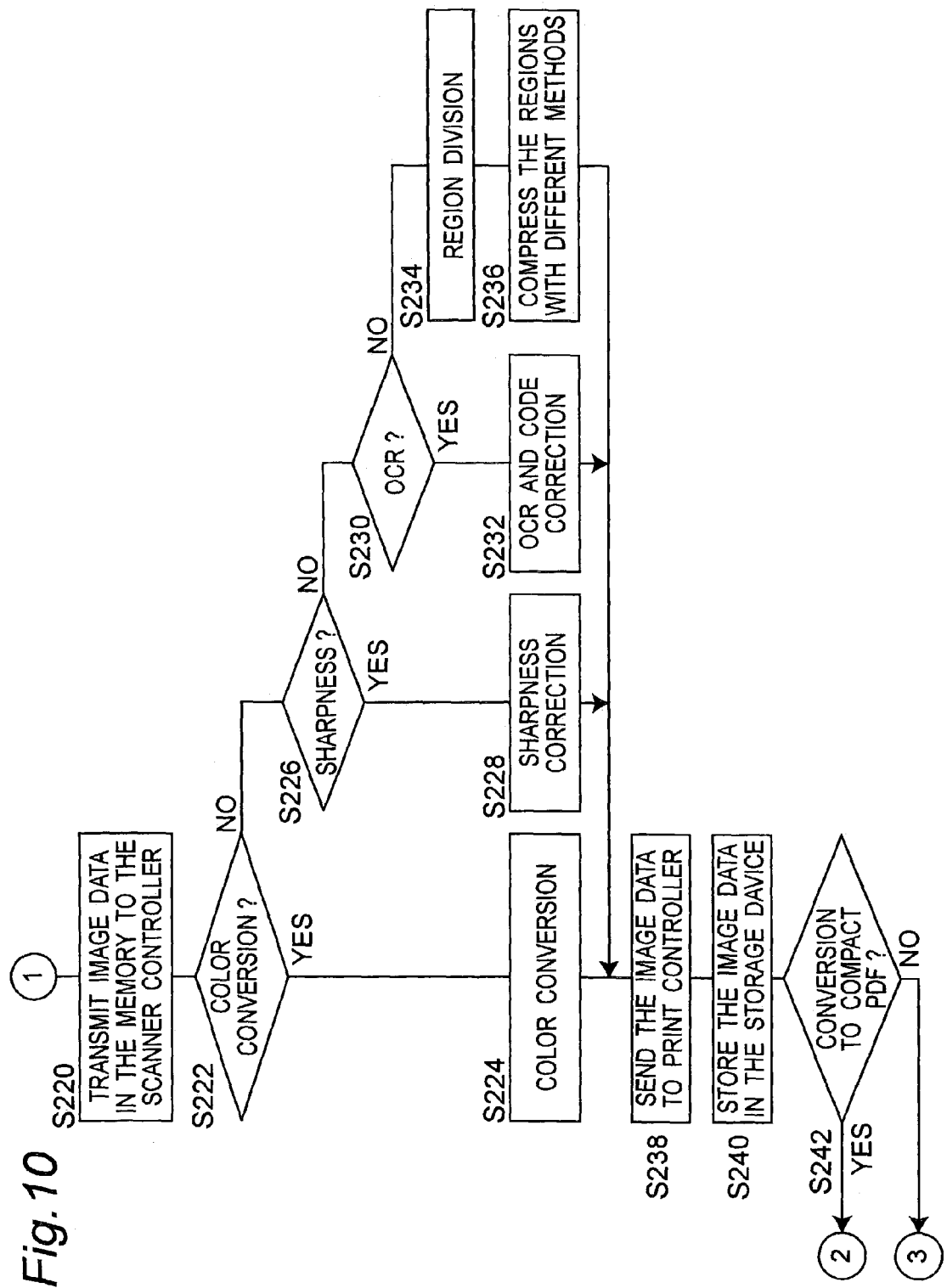
FIG. 10 is the other part of the flowchart of the printing of the multi-functional peripheral.
Figure 12:
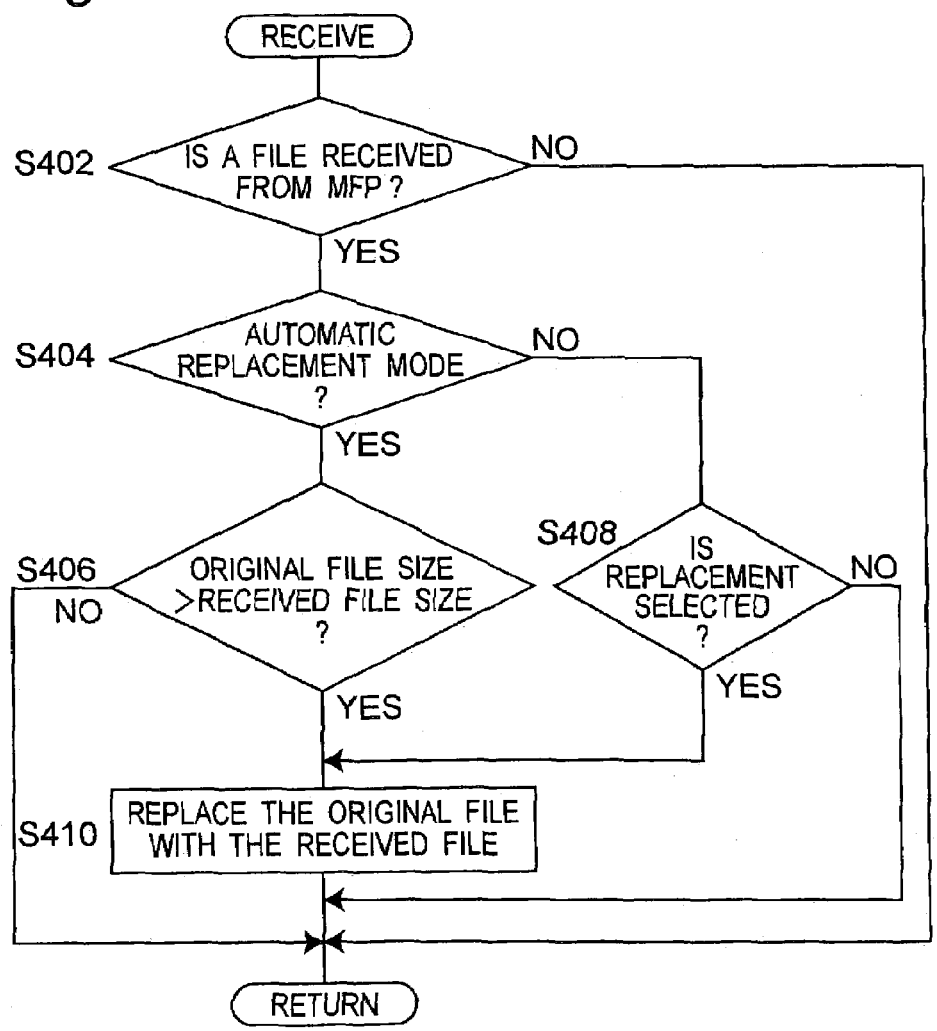
FIG. 12 is a flowchart of receive processing.

FIG. 12 shows a flow of receiving an e-mail (FIG. 10, S400). This receive processing corresponds to the file replacement control program 44. When an e-mail with a file is received from the MFP 4 (YES at S402), if the automatic replacement mode is set (YES at S404), it is decided next whether the file size of the original file is larger than that of the received file or not (S406). When the file size of the original file is larger than that of the received file (YES at S406), the original file is replaced with the received file (S410). If the automatic replacement mode is not set (NO at S404), it is decided next whether replacement is selected or not by a user (S408). When replacement is selected (YES at S408), the flow proceeds to step S410 to replace the original file with the received file, while when replacement is not selected (NO at S408), file replacement is not performed.

As explained above, a user can use an image processing apparatus equipped with a plurality of functions more easily by performing a second function while dealing with a first function. For example, when an image data is printed, file format thereof is converted simultaneously, and the converted file is replaced with the original file in the host computer, so as to decrease the amount of data in the host computer.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus equipped with a plurality of processings for image data, comprising:
    a communication device which receives image data and a command from an external device, and which transmits image data to the external device through a network;
    a first processor which performs a first processing in the plurality of processings for the image data received by said communication device;
    a second processor which performs a second processing in the plurality of processings, different from the first processing, for the image data received by said communication device; and
    a controller which makes said first processor perform the first processing, outputs an image data processed with the first processing, and, if the command includes a request for simultaneous processing, automatically makes said second processor perform the second processing and transmits the image data processed by said second processor through said communication device to the external apparatus.

2. The image processing apparatus according to claim 1, wherein said first processor performs printing of the image data.

3. The image processing apparatus according to claim 1, wherein said first processor transmits a file of portable document format of the image data.

4. The image processing apparatus according to claim 1, wherein said second processor performs file conversion of the image data.

5. The image processing apparatus according to claim 4, wherein an amount of image data is reduced by the file conversion.

6. The image processing apparatus according to claim 1, wherein said second processor performs color conversion or correction with use of optical character recognition for the image data.

7. A computer-readable recording medium recording a program comprising:
  receiving image data and a command through a network;
  performing a first processing in the plurality of processings for the received image data;
  performing a second processing in the plurality of processings, different from the first processing, for the received image data; and
  when a command received in the receiving step instructs the first and second processings, activating a step of performing the first processing for image data received in the receiving step, activating a step of outputing the image data processed with the first processing and automatically activating a step of performing the second processing for the image data; and
  transmitting the image data subjected to the second processing through a communication device to an apparatus from which the image data was received.

8. A method of image processing, the method comprising:
  receiving image data and a command through a network;
  performing a first processing in the plurality of processings on the received image data;
  performing a second processing in the plurality of processings, different from the first processing, on the received image data;
  when a command received in the receiving step instructs to execute the first and second processings, activating a step of performing the first processing for the image data received in the receiving step, activating a step of outputting the image data processed with the first processing and automatically activating a step of performing the second processing for the image data; and
  sending the image data subjected to the second processing through a communication device to an apparatus from which the image data was received.

* * * * *